(12) United States Patent
Zierer et al.

(10) Patent No.: US 7,836,645 B1
(45) Date of Patent: Nov. 23, 2010

(54) DEVICES AND METHODS FOR PROTECTING EXPOSED PIPE ENDS

(75) Inventors: Donald R. Zierer, St. Charles, IL (US); Michael L. Stiglianese, St. Charles, IL (US)

(73) Assignee: Zierer Investment Enterprises, LLC, St. Charles, IL (US)

( * ) Notice: Subject to any disclaimer, the term of this patent is extended or adjusted under 35 U.S.C. 154(b) by 1213 days.

(21) Appl. No.: 11/340,833

(22) Filed: Jan. 26, 2006

Related U.S. Application Data

(63) Continuation-in-part of application No. 10/972,290, filed on Oct. 22, 2004, now Pat. No. 7,464,507.

(51) Int. Cl.
*E04C 2/52* (2006.01)
(52) U.S. Cl. .......................... 52/220.8; 52/220.1; 52/96
(58) Field of Classification Search ................ 52/220.1, 52/220.8, 98, 99, 591.4, 219, 576, 577
See application file for complete search history.

(56) References Cited

U.S. PATENT DOCUMENTS

| | | | |
|---|---|---|---|
| 3,163,909 A | 1/1965 | Williams | |
| 3,469,815 A | 9/1969 | Brennerman | |
| 3,609,210 A | 9/1971 | Guritz | |
| 3,701,837 A | 10/1972 | Fork | |
| 3,956,573 A | 5/1976 | Myers et al. | |
| 5,125,619 A | 6/1992 | Collins | |
| 5,146,720 A | 9/1992 | Turner | |
| 5,180,074 A | 1/1993 | Bowman et al. | |
| 5,257,487 A | 11/1993 | Bantz et al. | |
| 5,350,884 A | 9/1994 | Littrell | |
| 5,377,939 A | 1/1995 | Kirma | |
| 5,593,115 A | 1/1997 | Lewis | |
| 5,595,362 A * | 1/1997 | Rinderer et al. ............ 248/27.1 |
| 5,615,850 A | 4/1997 | Cloninger | |
| 5,836,130 A | 11/1998 | Unruh et al. | |
| 6,061,983 A | 5/2000 | McCleskey | |
| 6,176,057 B1 | 1/2001 | Bouchet et al. | |
| 6,672,029 B2 | 1/2004 | Tucker | |
| 6,725,611 B2 | 4/2004 | DeFiglio | |
| 6,780,101 B2 * | 8/2004 | Buhler et al. .................. 34/437 |
| 7,475,575 B1 * | 1/2009 | Greenfield et al. ............. 70/18 |
| 2006/0096195 A1 | 5/2006 | Zierer | |

* cited by examiner

*Primary Examiner*—Jeanette E Chapman
*Assistant Examiner*—Daniel Kenny
(74) *Attorney, Agent, or Firm*—J. Dziezak

(57) ABSTRACT

Devices are provided for protecting pipe ends at a construction site on which concrete will be poured from being moved out of position or damaged during construction or from injuring workers. The devices have an upper frame and an enclosure adapted to fit together to form a rigid, generally rectangular-shaped body having a recess into which the pipe ends to be protected extend when the body is positioned in place. The body, dimensionally configured to fit between frame studs that will installed later in construction, has fastening tabs for securement to a base on which concrete will be poured. After the concrete has set, the body—partially embedded in the concrete—provides tradesmen access to the pipe ends within via an open top. Methods are also disclosed for protecting exposed pipe ends utilizing the inventive devices.

17 Claims, 10 Drawing Sheets

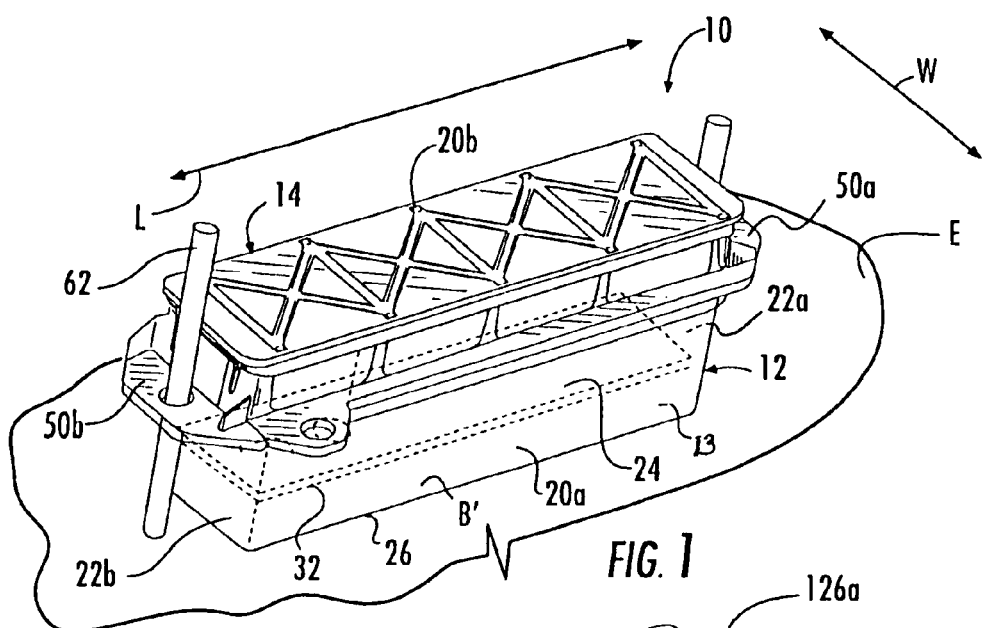
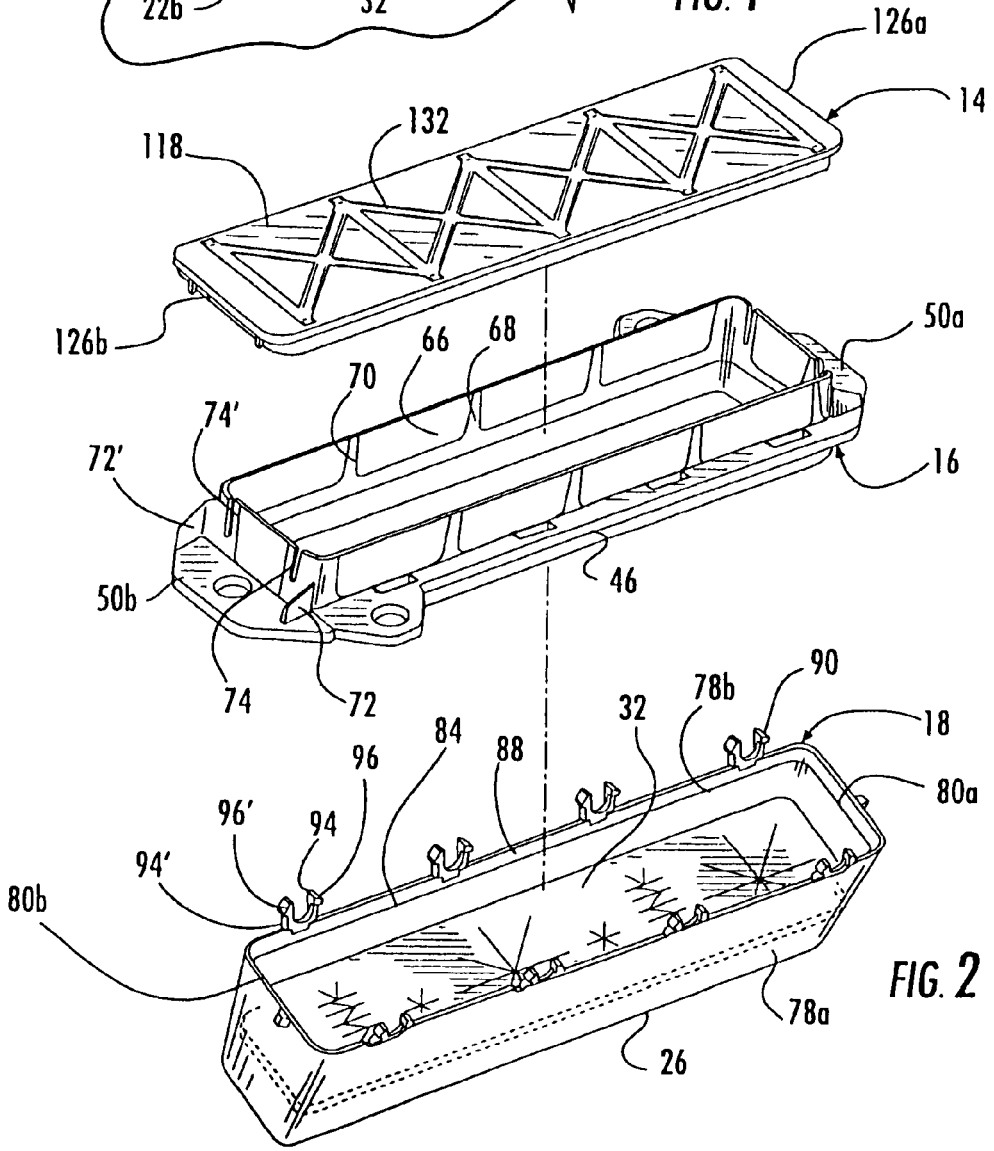

DEVICES AND METHODS FOR PROTECTING EXPOSED PIPE ENDS

This application is a continuation-in-part of U.S. patent application Ser. No. 10/972,290, filed on Oct. 22, 2004, now U.S. Pat. No. 7,464,507.

FIELD OF THE INVENTION

This invention relates to devices and methods for securing pipe ends in position at a construction site prior to concrete being poured around the pipes and for protecting the pipe ends as construction continues.

BACKGROUND OF THE INVENTION

In the construction industry, builders of homes and other structures typically lose significant capital in correcting the position of pipes, including electrical conduit, that were moved out of position accidentally by workmen or poured concrete during an early stage of construction.

Conventionally, pipes and conduit are laid so their ends project upwardly above what will be the surface of a concrete floor, whether the concrete will be formed on a prepared ground or on a structural floor at an elevated level in a multi-level building. The pipe ends have an upward orientation so that after the concrete has been poured and set, the projecting ends can be connected to piping and conduit that will convey utilities to particular areas of the building. Typically, before the concrete is poured, the exposed ends of the pipes are tied together in succession and to an external support for securement. However, in spite of such efforts, the pipe ends frequently become bent or twisted in a variety of directions by, e.g., workmen backing into a pipe or the unyielding force of the poured concrete.

Before construction can continue, the orientation of the pipes needs to be corrected so that utility connections can be made and the pipes would not otherwise project through a finished wall, making an undesired entrance into an adjacent room. However, the misalignment of the pipes often makes it difficult, if not impossible, for tradesmen to complete the connection of utilities. Moreover, efforts to correct the misalignment are not always successful, as they may result in a pinched diameter of the bent pipe. Further, correction of the problem costs time and money: the solution generally entails removing—by jack hammering—concrete from around the pipes, manually repositioning the pipes, and then repouring concrete around the correctly positioned pipes.

Additionally, the construction industry incurs significant costs in repairing pipes and conduit that are damaged during later stages of construction, such as the accidental puncturing of plumbing pipes by nail guns during installation of drywall or trim.

Yet another problem facing the construction industry concerns the potential hazard the upwardly projecting pipe ends pose to workmen at the work site. The pipe ends project upwardly to varying heights—ranging from ankle high to waist high. The exposed pipe ends put workmen at risk of injury should they fall, trip or become impaled on a projecting pipe.

Recent developments have provided means of separating, organizing, and stabilizing water pipes prior to the forming a floor slab. For example, U.S. Pat. No. 5,836,130 to Unruh et al. describes a water line guide that is placed level with the top of the finished slab. The device has an elongated narrow plate with longitudinally spaced-apart holes, a cylindrical portion that is integral with the plate, and a separate cylindrical sleeve that fits inside the cylindrical portion for placing around a vent pipe. Such device, however, leaves pipe ends exposed above the concrete surface.

Therefore, a need exists for a system and method of protecting pipes, which provides a solution to the foregoing problems.

BRIEF SUMMARY OF THE INVENTION

The present invention is directed to devices and methods for protecting the upwardly projecting pipe ends at a construction site from being moved out of position or from causing injury to workers. The devices and methods are suitable for protecting a single pipe as well as an array of pipes (such as water and drain pipes), conduit and other tube-like devices which, in final construction, are typically situated between frame studs, behind drywall or counters, or the like.

One aspect of the invention is directed to a pipe protector having an upper frame, an enclosure secured to the upper frame by any suitable interlocking means to form a body, a platform disposed in the assembled body, and body-fastening means for securing the pipe protector to a base. The body, which defines a recess and has a bottom edge, is suitable for positioning around an area of a base that has at least one pipe end projecting therefrom, around which concrete will be poured, to protect such pipe end from damage by the concrete or workers. The platform has at least one opening formation which is configured to correspond with the pipe ends on the base. Each opening formation may be configured to accommodate one or more pipe ends. When the body is positioned on the base, the pipe ends extend through the corresponding opening formation and into the recess of the body where the platform provides further support to the pipe ends. In one embodiment, the platform is located from about ½ inch to about 4 inches from the bottom edge of the body to facilitate the positioning of the pipe protector on an uneven surface. In one embodiment, the platform is secured to the enclosure; e.g., at the bottom edge or within the recess. In another embodiment, the platform is disposed within the recess by any suitable support. In yet another embodiment, the enclosure and the platform are a single unitary piece, fabricated by molding and most preferably, by injection molding.

In one embodiment, the upper frame has two opposed frame ends, two opposed sides, a top edge defining an open top end, and an opposed bottom connecting portion. The enclosure has two opposed ends, two opposed sides, a bottom edge, and an opposed top connecting portion. In the assembled body, the top connecting portion of the enclosure is interfaced against the bottom connecting portion of the upper frame.

In one embodiment, the body-fastening means comprises at least one fastening member of any suitable form. The fastening member defines an aperture which is adapted for receiving a securing structure therethrough for securing the pipe protector to the base. In one embodiment, the fastening member extends outwardly from at least one portion of the enclosure selected from the ends and the sides of the enclosure. In another embodiment, the fastening member extends outwardly from at least one portion of the upper frame selected from the frame ends and the frame sides of the upper frame. In another embodiment, the body has four walls and the fastening member includes a first fastening member extending outwardly from one wall of the body and a second fastening member extending outwardly from another wall of the body into a parallel but different plane with respect to the first fastening member to permit the pipe protector to be interconnected to another adjacent pipe protector. Such interconnection may be end-to-end or end-to-side to accommodate a variety of piping arrangements.

In one embodiment, the upper frame is secured to the enclosure by any suitable means such as an interlocking structure on the upper frame for mating with a complementary interlocking structure on the enclosure to permit attachment of the upper frame to the enclosure to form the body. In another embodiment, the pipe protector includes a plurality of first interlocking structures on the upper frame and a plurality of complementary second interlocking structure on the enclosure to permit attachment of the upper frame to the enclosure to form the body. The plurality of first interlocking structures is disposed on at least two of the frame sides, the frame ends, the enclosure sides, the enclosure ends, and a combination thereof. For example, the first interlocking structures may be disposed on both opposed frame sides or on both frame ends of the upper frame, or on one frame side of the upper frame and on one side of the enclosure. The plurality of complementary second interlocking structures is correspondingly positioned on the other of the upper frame and the enclosure for interlockingly engaging the first interlocking structures to interlock the upper frame and the enclosure together to form the body. The first interlocking structures may, for example, be in the form of male-type connectors, and the second interlocking structures in the form of female-type connectors, or vice versa. In one embodiment, for example, the interlocking means includes a plurality of clips that protrude upwardly from the sides of the enclosure, and a plurality of clip receptacles which are correspondingly positioned on the frame sides of the upper frame, each clip receptacle being complementary to one clip for mating with such clip to interlock the upper frame to the enclosure to form the body. The complementary clips and clip receptacles engage when the bottom connecting portion is interfaced against the top connecting portion, so each clip receptacle is in relational cooperation with the corresponding clip.

Another aspect of the invention relates to a pipe protector comprising an upper frame, an enclosure substantially as described above secured to the upper frame to form a body which defines a recess and has a bottom edge, a level indicator disposed on the body for providing a sight line for concrete, and body-fastening means for securing the pipe protector to the base. The level indicator may be any suitable means for indicating position; e.g., a groove, a mark, an etching, and a flange, the latter of which extends outwardly from the body.

Yet another aspect of the invention is directed to a pipe protector comprising a body having a bottom edge and defining a recess in communication with an open top end, a platform disposed in the body, and body-fastening means for securing the pipe protector to the base. The body is suitable for positioning around an area of base having at least one pipe end projecting therefrom to protect the pipe end from damage by concrete and workers. The platform has at least one opening formation configured to correspond with the pipe ends so that when the pipe protector is placed on the base, the pipe ends extend through the corresponding opening formation and into the recess. As such, the platform further secures the position of the pipe protector on the base, preventing lateral movement, and provides support to the pipe ends within the recess. In one embodiment, the platform is secured to the body at the bottom edge or within the recess. In another embodiment, the platform is supported within the recess any suitable means. In yet another embodiment, the platform is located from about ½ inch to about 4 inches from the bottom edge of the body to facilitate the positioning of the pipe protector on an uneven surface such as gravel. In one embodiment, the body-fastening means comprises at least one fastening member, which defines an aperture that is adapted to receive a securing structure therethrough for securing the pipe protector to the base. The fastening member may, e.g., be in the form of a tab or a band. In one embodiment, the body has four walls, and the fastening member extends outwardly from at least one wall. In another embodiment, the body includes at least one removable segment to provide an expanded access into the recess.

Still another aspect of the invention is directed to a pipe protector comprising a body having a bottom edge and defining a recess in communication with an open top end, a level indicator for providing a sight line for concrete, and body-fastening means for securing the pipe protector to the base. The body is suitable for positioning on a base around an area that has at least one projecting pipe end for protecting such pipe end from damage. In one embodiment, the body-fastening means comprises at least one fastening member which extends outwardly from at least one wall of the body which has four walls. The fastening member, which comprises a tab or a band, defines an aperture. The aperture is adapted to receive a securing structure therethrough for securement of the pipe protector to the base.

Another aspect of the invention is directed to a method of protecting pipe ends using any of the inventive pipe protectors. In one embodiment, the method includes (a) providing a pipe protector having a body defining a recess and comprising an upper frame and an enclosure secured to the upper frame by any suitable interlocking means to form the body, a level indicator for providing a sight line for concrete depth outside the pipe protector, a bottom edge, and at least one fastening member for fastening the pipe protector to a base; (b) prior to the pouring of concrete, positioning the pipe protector on the base having at least one pipe end extending therefrom such that the bottom edge substantially contacts the base and the pipe end extends into the recess so the pipe protector forms a barrier between an area of the base having the pipe end and an area external to the pipe protector on which the concrete will be poured; and (c) securing the pipe protector to the base. In one embodiment, the securing step comprises driving an elongated member through one fastening member and into the base to a depth sufficient to secure the pipe protector to the base.

The concrete is poured around the pipe protector and the securing structure is removed from above the concrete surface after the concrete has set. In yet another embodiment, the method further comprises cutting the pipe ends in the recess to a height that does not exceed the height of the body. In one embodiment wherein the upper frame comprises a plurality of removable segments, the method further comprises breaking away at least one removable segment to allow an expanded access into the recess. In another embodiment, the method includes attaching a removably attachable cover to the body to prevent concrete from entering the recess.

The method provides for forming a train of pipe protectors positioned end-to-end or end-to-side, as needed. In one embodiment wherein the body comprises four walls and the fastening member comprises a first fastening member extending outwardly from one wall of the body and a second fastening member extending outwardly from another wall of the body into a parallel but adjacent plane with respect to the first fastening member, the method further comprises: (a) placing a second pipe protector adjacent to the previously positioned pipe protector so the first fastening member on the second pipe protector overlaps with the second fastening member on the previously positioned pipe protector; (b) interconnecting the adjacent pipe protectors; and (c) repeating the placing and interconnecting steps as needed to form a train of pipe protectors sufficiently long for protecting an array of pipe ends.

The inventive devices and methods offer numerous commercial advantages over conventional construction techniques, including protection of pipes from external forces, reduced production costs by eliminating the need to break out concrete and manually re-align the pipes, reduced material costs by allowing shorter projecting pipe ends to be used for completing connections to utilities, and accelerated production time. In addition, the enclosure of the pipe ends within a device that becomes partially recessed in the concrete—after a concrete slab has been formed around the pipe protector—reduces safety hazards at the work site. Further, the inventive pipe protectors provide access to tradesmen for making the requisite connections to the pipe ends.

BRIEF DESCRIPTION OF THE DRAWINGS

Other advantages and features of the invention will become more apparent from the following description and from reference to the accompanying drawings in which:

FIG. 1 shows a perspective view of one embodiment of a pipe protector, with a cover, secured to a base on which a concrete slab will be formed;

FIG. 2 is an exploded perspective view of the pipe protector of FIG. 1;

FIGS. 4A-C show the upper frame of the pipe protector of FIG. 1, wherein FIG. 4A is a top view, FIG. 4B is a side elevational view, and FIG. 4C is a perspective view of the underside of a portion of the upper frame;

DETAILED DESCRIPTION OF THE INVENTION

This invention includes all alternatives, modifications, and equivalents that may be encompassed within the spirit and scope of the invention, as defined by the appended claims. Where a preferred embodiment is described below, the invention is not limited to that embodiment. For example, features shown in a drawing or described as part of one embodiment may be included in another embodiment of the invention. Throughout the following, like numerals refer to like parts or steps.

As used herein, the following terms have the meanings set forth below:

"Base" refers to any surface over which concrete will be poured in the construction of a building or other structure. The term refers to both a grade of prepared ground, typically of gravel over ground in the construction of a building slab, and to a structural floor in a multi-level building.

"Building" refers broadly to residential and commercial buildings and other such structures.

"Pipe" refers broadly to a pipe, conduit, and any other elongated tube-like device suitable for conveying utilities such as water and gas, and wires for electric, phone or data transmission within a building, including drainage pipes. In this application, the terms "pipes" and "pipe ends" are used interchangeably.

"Serially adjacent" and "serially adjacent to" refer to the positioning of two pipe protectors so the longitudinal end of one pipe protector faces a longitudinal end of the other pipe protector. The term "adjacent" and "adjacent to" refers to the positioning of two pipe protectors so the longitudinal end of one pipe protector faces a longitudinal end or a side of the other pipe protector, as needed.

"Stud" refers to the supports made of wood, plastic, fiberglass, steel and other materials used in the construction of a building frame.

FIGS. 1-17 illustrate examples of embodiments of the inventive pipe protectors. Shown in FIGS. 1-11 generally and FIGS. 1-3 in particular is a pipe protector 10. Pipe protector 10 has a rigid body 12 with a generally four-sided cross-sectional shape, and an optional snap-lock cover 14, shown in FIG. 1 in a snap-locked position over body 12.

Figure 15:
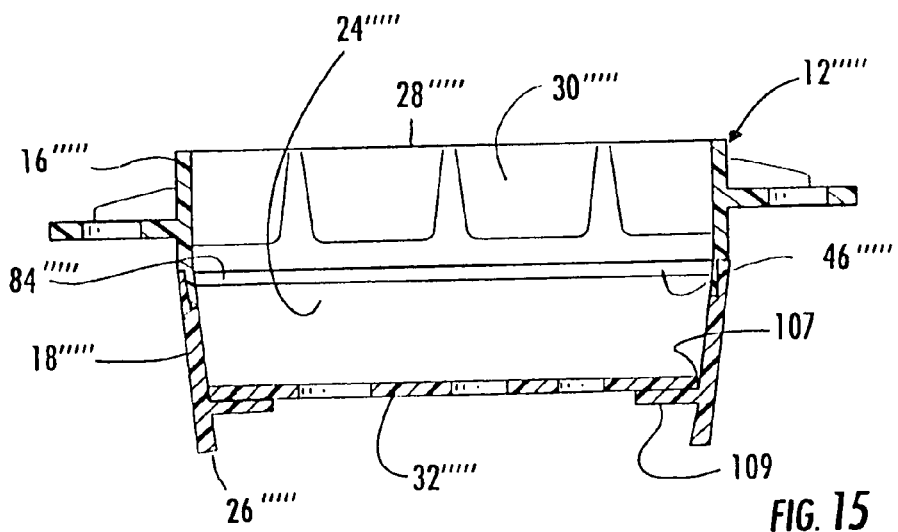
FIG. 15 shows a cross-sectional view of another embodiment of a pipe protector in which the platform is dropped into the assembled body and supported in the recess.

Body 12 has an upper frame 16 and an enclosure 18 which are adapted to interlock together to form the body. In an assembled formation, body 12 has four walls 13 comprising two laterally opposed sides 20a,20b and two opposed longitudinal ends 22a,22b which together define a recess 24. The body sides 20a,20b and longitudinal ends 22a,22b extend upwardly from a substantially planar bottom edge 26, terminating in an opposed top edge 28 which defines an open top end 30 for providing access to the pipe ends that are surrounded by body 12 when it is positioned on a base. In the embodiment shown, securely attached to the enclosure is a generally planar platform 32 having a plurality of opening formations 34 along a longitudinal axis, which are configured to accommodate each pipe end that requires protection. Herein the term "opening formation," singular or plural, refers to both actual openings and pre-openings where the pre-openings have at least one weakened line such as a perforated line or a scored line that may be separated to form an aperture for a pipe end to extend therethrough. In FIGS. 1-2, platform 32 is shown secured in the recess 24 to an interior surface of the enclosure. In other embodiments, discussed below, the platform may be substantially flush with the bottom edge (FIG. 13), absent (FIG. 12), or dropped into the body and supported within the recess (FIG. 15).

Figure 3:
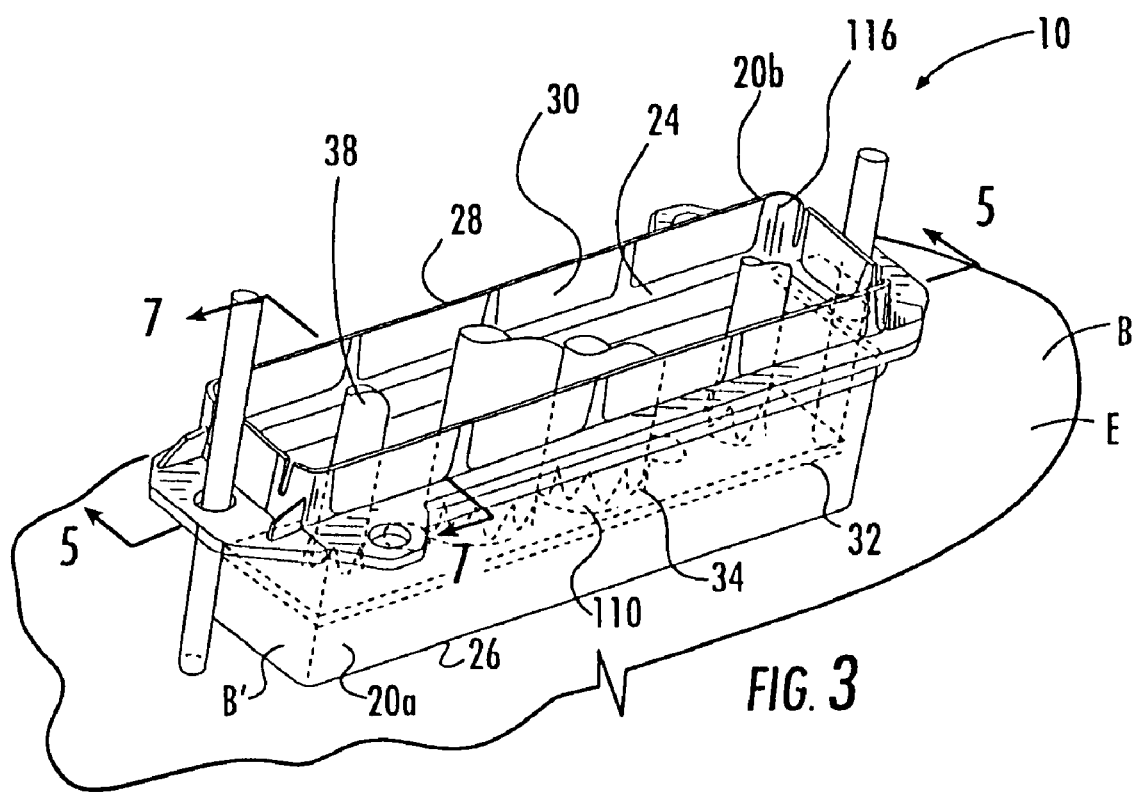
FIG. 3 is a perspective view of the pipe protector of FIG. 1, shown without a cover and with pipe ends extending into the device.
Figure 11:
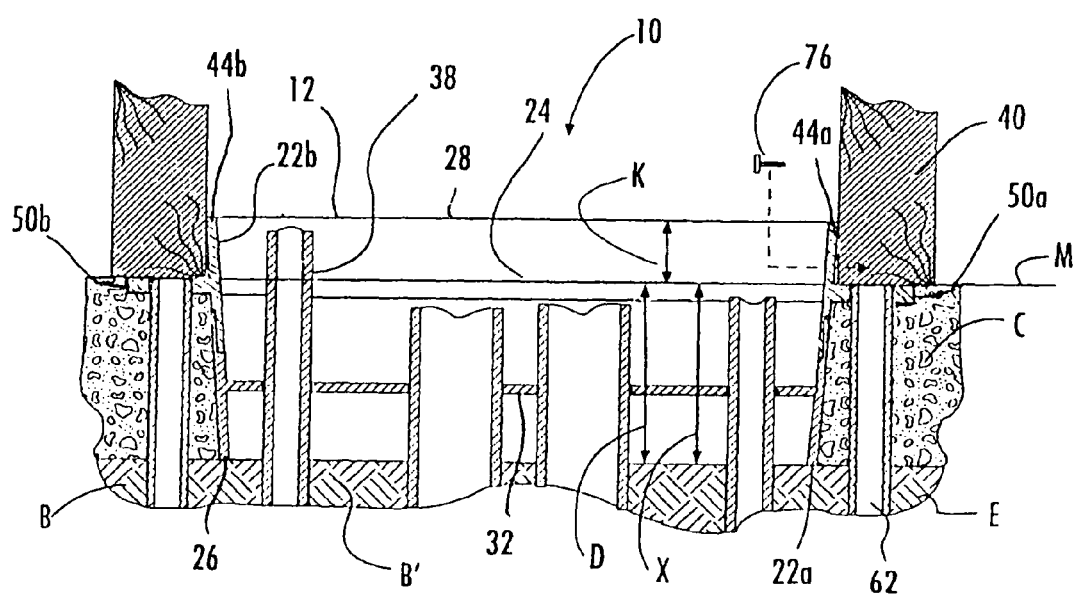
FIG. 11 is a sectional view of the pipe protector of FIG. 1, without a cover, taken along line 5-5, shown recessed in concrete during later construction.

FIG. 3 shows pipe protector 10 secured to a base B on which a concrete slab C will be formed, surrounding a group of pipe ends 38 that project from the base. When body 12 is positioned on the base, the bottom edge 26 substantially contacts the surface of the base B. In the embodiment shown, each pipe end 38 extends through a corresponding opening formation 34 in the platform 32 and into the recess 24. In such position, body 12 forms a protective barrier between an area of the base B surrounding the pipe ends 38 and the remainder of the base E external to the body 12 on which the concrete will be poured. FIG. 11 depicts the pipe protector 10 during a later stage of construction, after the concrete C has been poured and set and frame studs 40 have been erected on the concrete C against the portion of the longitudinal ends 22a, 22b of the body that extends above the concrete surface. Though recessed in the partially embedded body 12, the pipe ends 38 remain accessible to tradesmen for the requisite connections.

Figure 4A:
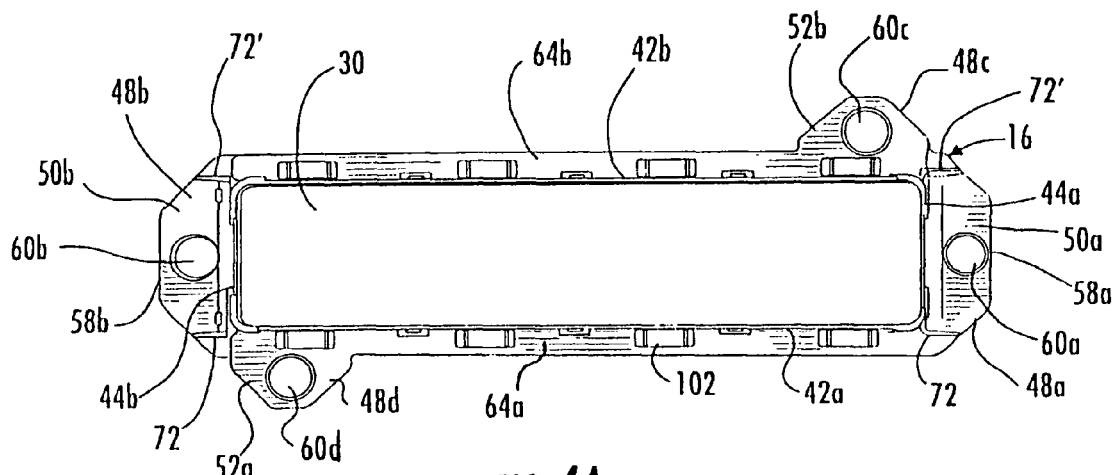
Figure 4B:
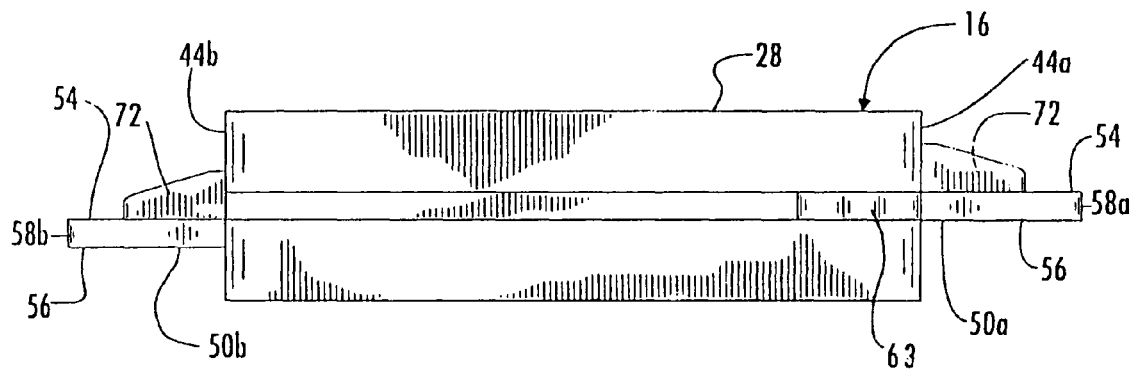
Figure 4C:
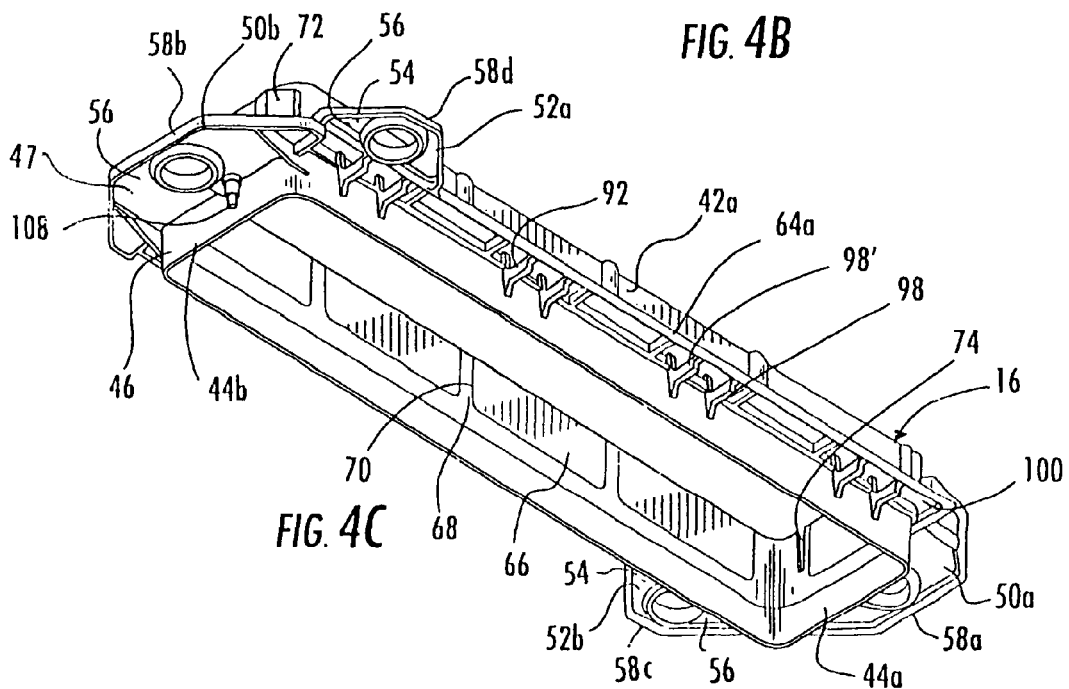
Figure 16:
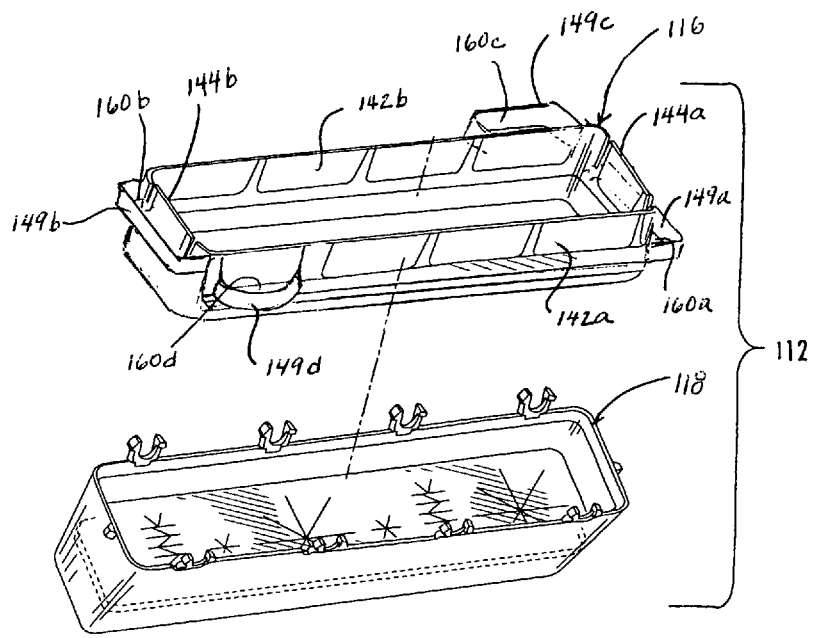
FIG. 16 shows a perspective view of another embodiment of a pipe protector having a band as a fastening member.

FIGS. 4A-C illustrate upper frame 16, which has two opposed frame sides 42a,42b and two opposed longitudinal ends 44a,44b, also called "frame ends" herein, which define the open top end 30 of the body, a bottom connecting portion 46, and at least one fastening member 47 for securing the assembled body 12 to the base. The fastening member may be of any suitable form such as a fastening tab 48a,48b,48c,48d shown in FIGS. 4A-C or a band 149a,149b,149c,149d shown in FIG. 16, as examples. In the embodiment shown in FIG. 4, each fastening tab 48a,48b,48c,48d extends outwardly in substantial planar alignment with the top edge 28 from the frame end 44a,44b in the form of a lateral tab 50a,50b, or from the frame sides 42a,42b in the form of an alternate staking tab 52a,52b. Preferably, upper frame 16 has at least two fastening tabs 48a,48b,48c,48d selected from the group consisting of at least one lateral tab 50, at least one alternate staking tab 52, and a combination thereof. As shown in FIG. 16, band 149a,149b,149c,149d extends outwardly from any frame side or frame end of the upper frame 116. In an alternative embodiment (not shown), the band may extend from any side or end of the enclosure 118. Band 149a,149b,149c, 149d may be of any shape and dimension that is suitable for accepting a securing structure, such as a rope or an elastic band affixed to the body or a rigid material integral with the body, as examples. Preferably, upper frame 116 has at least two bands.

The lateral tab 50a,50b extends outwardly from at least one frame end 44a,44b and preferably both frame ends. In one embodiment, the alternate staking tab 52a,52b extends outwardly from at least one frame side 42a,42b. The embodiment shown in FIGS. 4A-C has two lateral tabs 50a,50b and two alternate staking tabs 52a,52b. Although each alternate staking tab 52a,52b is shown positioned adjacent one of the opposed end portions 44a,44b so as to be diagonally opposed to each other, the alternate staking tabs 52a,52b may extend from any portion of the frame sides 42a,42b.

As shown in FIGS. 4A-C, each lateral tab 50a,50b and alternate staking tab 52a,52b has an upper surface 54, a lower surface 56, and an outer end 58a,58b which defines a tab aperture 60a,60b,60c,60d that is adapted to receive a securing structure 62 therethrough (shown in FIG. 1). The tab apertures may be of any shape desired, such as circles, squares, or rectangles, as examples. The securing structure 62 is generally an elongated member such as a pipe, a piece of conduit, a stake, a rod, a spike, a nail, and any other suitable securing device known in the art that can be inserted through the tab aperture 60a,60b,60c,60d and driven into the base B to a depth sufficient to secure the body to the base. Because such securing devices are well known in the art, a detailed disclosure is not provided here.

Figure 5:
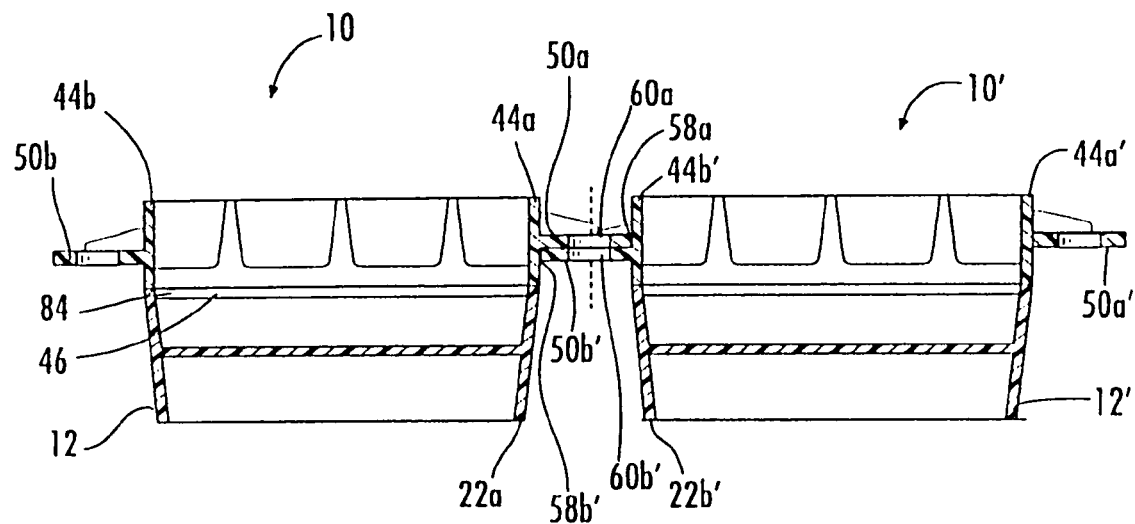
FIG. 5 is cross-sectional view of the pipe protector of FIG. 1, taken along line 5-5 of FIG. 1, positioned serially adjacent to another pipe protector.

As shown in FIG. 4B, the lateral tabs 50a,50b extend into two parallel but different planes with respect to each other. In one embodiment, the alternate staking tabs 52a and 52b also extend into two parallel but different planes with respect to each other, with one alternate staking tab 52a being in the same plane as one lateral tab 50a. Preferably, the planes are adjacent each other. As a result, in the embodiment illustrated in FIG. 5, one lateral tab 50a on pipe protector 10 may be aligned vertically in a cooperative spatial relationship with a lateral tab 50b' on a facing longitudinal end 22b' of another serially adjacent body 10'. The location of the tab aperture 60a,60b' with respect to the outer end 58a,58b' of the lateral tab allows the tab apertures 60a,60b' on two vertically aligned lateral tabs 50a,50b' to be vertically aligned so that a vertical centerline through each aperture is in correspondence and the serially adjacent pipe protectors may be interconnected in an end-to-end configuration. Although FIG. 5 shows only two pipe protectors 10,10' positioned end-to-end, any number of pipe protectors may be interconnected in a chain as needed. The planar relationship described above can exist between one lateral tab 50a,50b and one alternate staking tab 52a,52b on a pipe protector to permit two pipe protectors to be positioned end-to-side to accommodate alternate piping configurations.

FIG. 16 shows an upper frame 116 and an enclosure 118 of a body 112 in which the planar relationship described above exists as to the bands that extend from opposed walls of the upper frame 116. In body 112, bands 149a,149b from the frame ends 144a,144b of upper frame 116 extend into parallel but different planes with respect to each other. Similarly, bands 149c,149d from opposed frame sides 142b,142a extend into parallel but different planes with respect to each, so that each side band 149c,149d is in the same plane as one end band 149a,149b from frame end 144a,144b. In the embodiment shown, side band 149c is in planar alignment with end band 149b, and side band 149d is in planar alignment with 149a. This planar relationship allows body 112 to be positioned adjacent to another body 112 so an aperture 160a,160d defined by the band in one plane is in vertical alignment with an aperture 160b,160c defined by another band 149b,149c on a parallel but different plane. As a result, adjacent pipe protectors may be positioned in an end-to-end configuration and in an end-to-side configuration, as needed.

Lateral tabs 50a,50b and alternate staking tabs 52a,52b may be of any shape that is suitable for accepting a securing structure through the aperture 60a,60b,60c,60d, such as rectangular, semi-circular, or rhomboidal, for example.

As shown in FIG. 4B, upper frame 16 has a level indicator 63 for providing a sight line for the concrete to be poured. The level indicator 16 is disposed on at least one side of the upper frame and may be of any suitable form, such as a groove, a mark, an etching, or a flange, as examples. In the embodiment shown, the level indicator comprises a flange 64a,64b which extends outwardly from each frame side 42a,42b in a substantially planar relationship with the top edge 28. One flange 64a and preferably both flanges 64a,64b are in the same plane as one of the lateral tabs 52a,52b.

As shown in FIG. 4C, on frame sides 42a,42b, upper frame 16 can have a plurality of removable side wall segments 66 separated by a spine 68. Segments 66 are removable along a weakened perimeter 70, such as a perforated or scored line, to provide an expanded access to the pipe ends 38 in the recess 24 of the assembled body when set on a base.

In one embodiment, lateral tab 50a,50b has at least one stud support 72, and preferably a pair of stud supports 72,72', on the upper surface 54, as shown in FIGS. 4A-C. Each stud support 72,72' extends outwardly from the frame end 44a,44b in substantial vertical alignment with one of the frame sides 42a,42b. After the concrete has set around the pipe protector and the securing structure 62 has been removed from above the concrete surface, stud support 72,72' allows the end of a frame stud 40 to be placed on the lateral tab 50a,50b and abutted against the frame end 44a,44b of upper frame 16, as illustrated in FIG. 11.

As shown in FIG. 4C, on the frame end 44a,44b is at least one slot 74,74' for accepting a fastener 76 such as a nail or a screw for fastening the frame stud 40 to the assembled body 12. Fastener 76 is driven through slot 74,74' from inside the recess 24.

Figure 6:
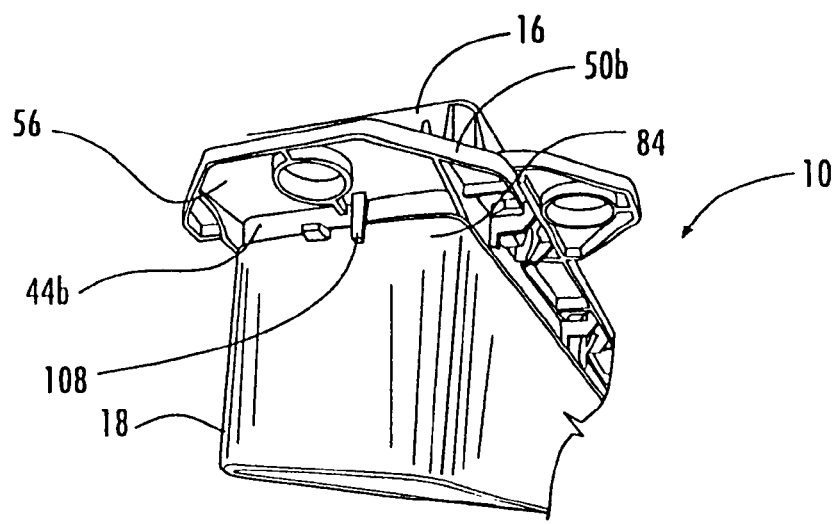
FIG. 6 is a perspective view of one end of the pipe protector of FIG. 1, showing the upper frame interlocked to the enclosure.
Figure 7:
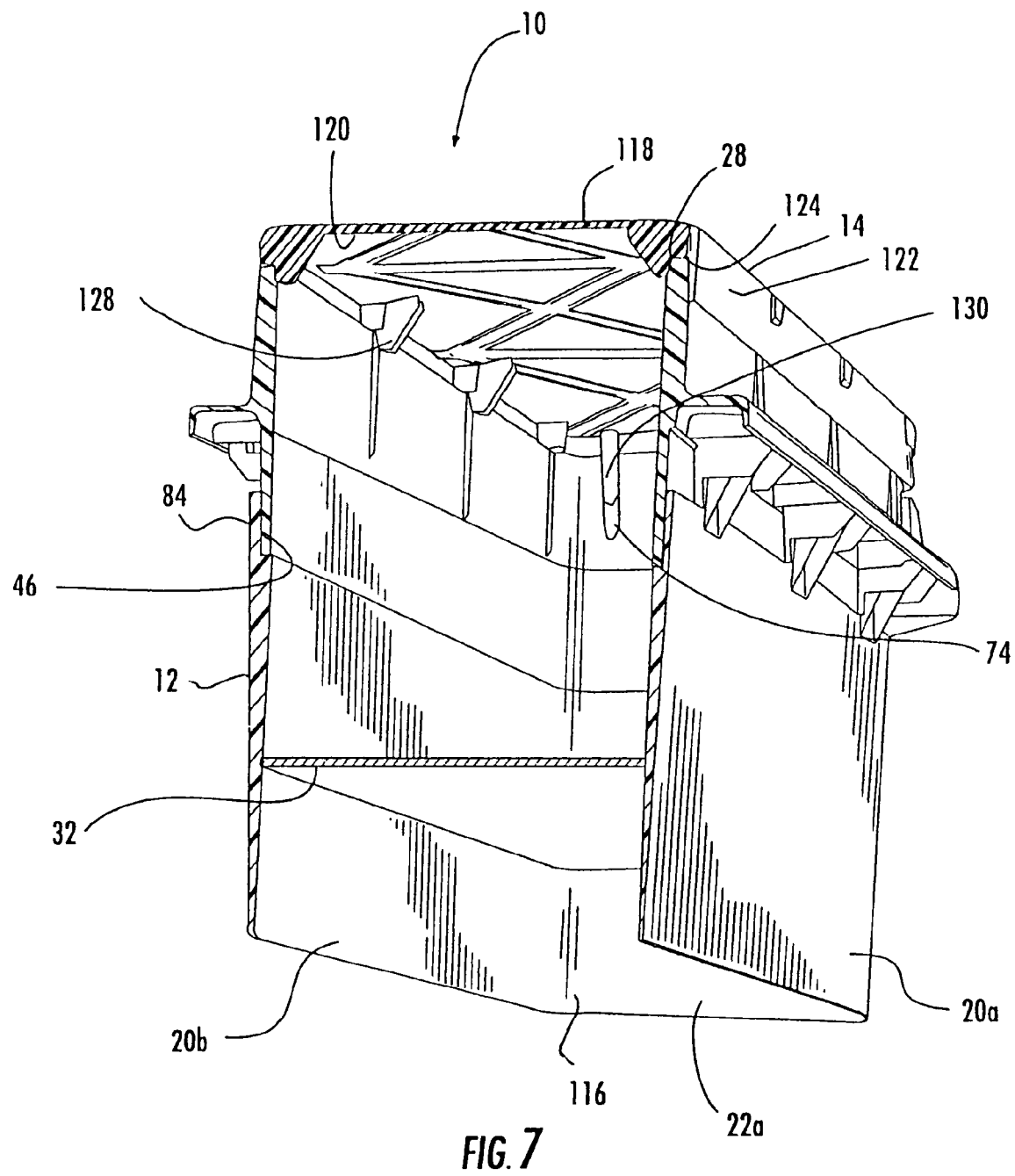
FIG. 7 is a perspective view of the interior of a cross-sectional portion of the assembled pipe protector of FIG. 1, taken along line 7-7.

Enclosure 18 has two opposed sides 78a,78b, two opposed ends 80a,80b, a top connecting portion 84, and the bottom edge 26 which is the bottom edge 26 of the assembled body 12. In one embodiment, the sides 78a,78b and ends 80a,80b diverge outwardly from the bottom edge 26. The inner cross-sectional shape of the top connecting portion 84 substantially conforms with the outer cross-sectional shape of the bottom connecting portion 46 of the upper frame 16, so that the bottom connecting portion 46 is insertable into the enclosure 18, as shown in FIGS. 6-7, to interface against the interior surface of the top connecting portion 84 in a substantially leak-proof manner to form the recess 24. In an alternative embodiment, the inner cross-sectional shape of the bottom connecting portion 46 substantially conforms with the outer cross-sectional shape of the top connecting portion 84 of the upper frame 16, so that the top connecting portion 84 is insertable into the upper frame 18 and interfaces against the interior surface of the bottom connecting portion 46 so as to form the recess 24.

In one embodiment, in the enclosure 18, a reinforcement band 88 (shown in FIG. 2) is disposed along the top connecting portion 84 for maintaining compression integrity as the body is assembled or pushed onto the pipe ends.

Figure 14:
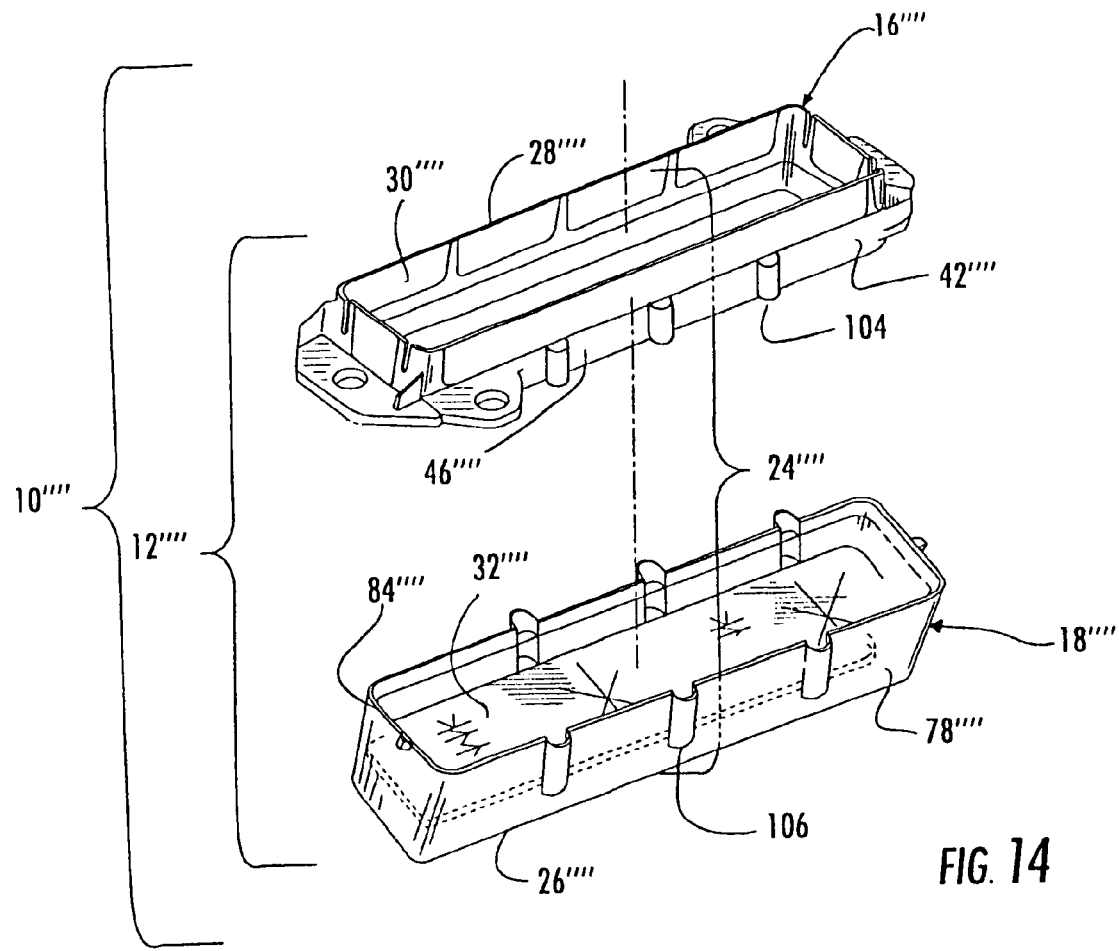
FIG. 14 shows a perspective view of yet another embodiment of a pipe protector.

In yet another embodiment, the level indicator 63, described above, is disposed on at least one side wall 20a,20b of the enclosure 18, as depicted in FIG. 14 with level indicator 63', a mark.

Upper frame 16 and enclosure 18 are interlocked together to form the body 12 by any suitable interlocking means known in the art such as an adhesive, a fastener such as a nut and bolt, and male- and female-type connectors—for example, hooks and slots, a ridge and a complementary groove, and pegs and holes. For instance, in the embodiment illustrated in FIGS. 1-13, upper frame 16 and enclosure 18 are interlocked by a plurality of clips 90, shown in FIG. 2, which protrude upwardly from the enclosure 18 and engage a plurality of correspondingly positioned clip receptacles 92 on upper frame 16, shown in FIG. 4C. The clips 90 extend from the top connecting portion 84 along each side 78a,78b of the enclosure 18, and the clip receptacles 92 are disposed on corresponding frame sides 42a,42b of the upper frame 16. Each clip 90 has a pair of spaced-apart first and second prongs 94,94' wherein the first prong 94 has a lip 96 oriented away from a lip 96' on the second prong 94'. The clip receptacle 92 has two parallel spaced-apart rail members 98,98' that extend outwardly and vertically from the frame sides 42a,42b to a lower surface 100 of flange 64a,64b to define a clip aperture 102 in the flange. Clip 90 is insertable between the rail members 98 until the lip 96 on each prong 94 terminates in the clip aperture 102, so as to engage the clip receptacle 92 and securely interlock upper frame 16 and enclosure 18 together to form the body 12. FIGS. 6-7 show exterior and interior views of the attachment of the upper frame 16 to the enclosure 18 in an assembled pipe protector 10.

FIG. 14 illustrates another embodiment of the pipe protector in which the interlocking means includes rods 104 and complementary rod pockets 106. A plurality of outwardly protruding vertical rods 104 extends from the frame sides 42'''' of the upper frame 16'''' for slidingly engaging with a plurality of complementary rod pockets 106 which are correspondingly situated on the sides 78'''' of the enclosure 18''''. When the bottom connecting portion 46'''' is aligned with the top connecting portion 84'''' so that each rod 104 corresponds spatially with a rod pocket 106, each rod 104 is insertable into the corresponding rod pocket until the outer surface of bottom connecting portion 46'''' is interfaced against the inner surface of top connecting portion 84'''' and each rod 104 is engaged within the corresponding rod pocket 106 to interlock the upper frame 16'''' and the enclosure 18'''' together, forming the body 12''.

As shown in FIGS. 4C and 6, an alignment post 108 extends downwardly from the lower surface 56 of the lateral tab 50a,50b for guiding the positioning of the enclosure 18 relative to the upper frame 16 during assembly of the pipe protector 10. The alignment post is disposed a sufficient distance from the frame end 44a,44b to accommodate the top connecting portion 84 of enclosure 18.

As shown in FIGS. 1-3, platform 32 has a shape and dimension conforming with a cross-section of the recess 24. In one embodiment, platform 32 is located from about ½ inch to about 4 inches, and preferably from about ¾ inch to about 3 inches, from bottom edge 26 to facilitate the positioning of pipe protector 10 on an uneven surface such as crushed stone.

The platform 32 is disposed in the enclosure 18. In one embodiment, the platform is attached to the enclosure 18 by any suitable means known in the art, such as with adhesives, nails or screws, or by being formed into the enclosure during manufacture; e.g., via molding. In another embodiment, the platform is supported in the recess via any suitable supporting structure which holds the platform in place. For example, as shown in FIG. 15, a shelf 109 protrudes into the recess 24'''' from an interior surface of at least two opposed walls of the enclosure 18'''' to support the platform 32'''' within the recess. The periphery 107 of the platform rests on the shelf 109. In yet another embodiment, the periphery of the platform may fit into a complementary groove on the interior surface of the enclosure. Any other suitable means of attachment or support may, however, be employed.

The plurality of opening formations in the platform corresponds to each pipe end that requires protection, meaning that each opening formation 34,34',34'' may be sized and positioned on the platform to accommodate one or more correspondingly positioned pipe ends, as needed. For example, as shown in FIG. 3, one opening formation 34 can fit over one pipe end, and as shown in FIG. 8C, opening formation 34a'' is sufficiently large to fit two or more pipe ends through. Further, because the platform 32 is typically configured to conform with standard plumbing and electric code requirements, not all the opening formations 34 may be utilized, such as when the pipe protector 10 is used to protect only one pipe end.

Figure 8A:
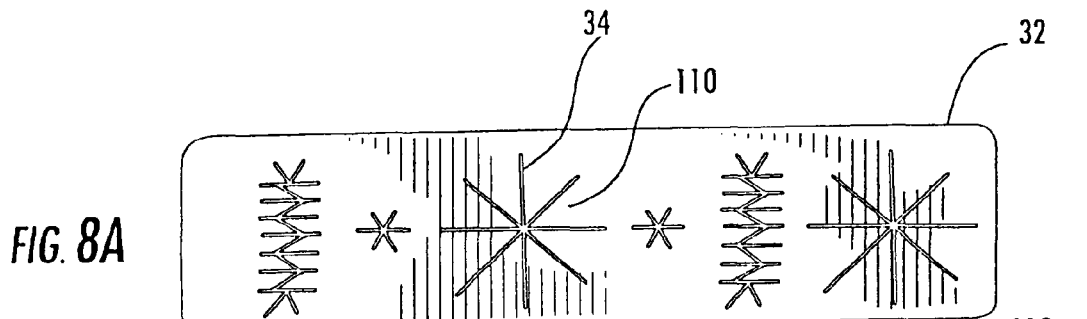
FIGS. 8A-C show a top view of several embodiments of a platform with various configurations of opening formations.
Figure 8B:
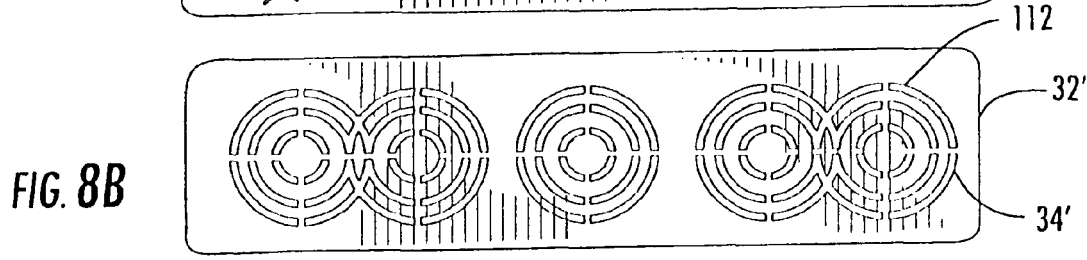
Figure 8C:
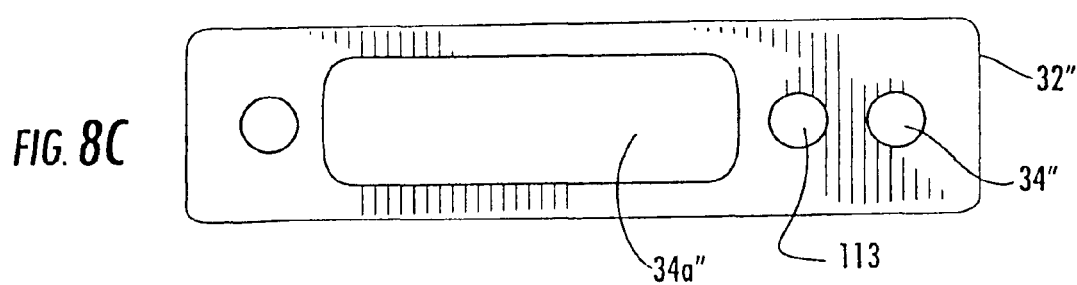

FIGS. 8A-C show examples of various configurations of the opening formations on the platform 32,32',32''. The opening formations 34 extend along a longitudinal axis and may be customized in shape, size, and location on the platform 32, as desired. Shown in FIG. 8A is one example of a pattern of opening formations 34 having platform segments 110 of various sizes and shapes that fold into recess 24, as shown in FIG.

3, when a pipe end 38 is inserted through the opening formation 34. Such folded-in segments 110 further reinforce the positioning of the pipe protector 10 on the base. The pattern shown yields openings of various shapes and sizes, including circular- and elliptical-shaped openings, where the elliptical shapes accommodate alternate positioning of pipes on the base. Shown in FIG. 8B is a platform 32' having a pattern of punch-out concentric rings 112 which have scored or otherwise weakened perimeters for easy removal for customizing the diameter and spatial orientation of the openings. Shown in FIG. 8C is another pattern wherein the opening formations 34" include pre-cut holes 113, through which pipe ends may be inserted. Any other suitable pattern of opening formations may, however, be used.

Body 12 is has a longitudinal length L from end 22a to end 22b, sufficient to fit between adjacent frame studs 40 that will be installed during later construction, as depicted in FIG. 11. The length of the body is generally less than about 14.5 inches; however, the length may be varied depending upon the particular nature of the construction. From body side 20a to body side 20b, body 12 has a width W that generally conforms substantially to the width of the frame stud 40 but may depend upon the nature of the construction. For example, in one embodiment, the width W may conform to that of other constructions materials such as a cinder block. Some curvature is generally provided along a vertical junction 116 between the body sides 20a,20b and the longitudinal ends 22a,22b, as shown in FIG. 7.

FIG. 7 shows the cover 14 which is removably attachable to top edge 28 of body 12 in a manner that protects the pipe ends 38 within from the accidental seepage of concrete over the top edge 28 and into the recess 24. The cover 14 can be a snap-on cover, a clamp-on cover, a cover that fits into the open top end 30 of the upper frame 16, or some other type of removable and reattachable cover, as an example.

Figure 10:
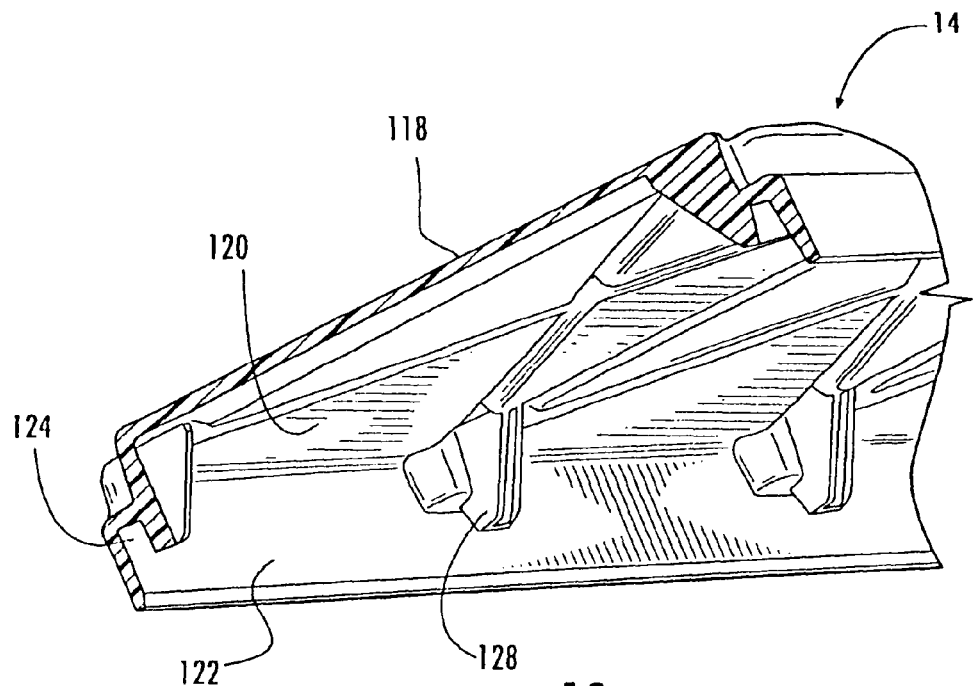
FIG. 10 is a perspective view of a fragmentary cross-section of the cover shown in FIG. 1.

For proper mating engagement with the body 12, cover 14 conforms to the shape of top edge 28. As shown in FIGS. 7 and 10, cover 14 has a top 118 with an underside 120, a downwardly extending skirt 122 depending from the top 118, a groove 124 which is complementary to top edge 28, and opposed cover ends 126a,126b. A plurality of posts 128 extends downwardly from the underside 120 parallel with the skirt 122. In one embodiment, an end post 130 that is complementary to slot 74 extends downwardly from the underside 120 to mate with slot 74 in the end wall 22a to further secure the cover 14 to the body 12. Complementary groove 124, formed between the skirt 122 and posts 128, permits the cover 14 and the body 12 to be snap-locked together to close the pipe protector 10 in a substantially leak-proof manner. Cover 14 is detachable from the body 14 by pulling upwardly on the opposed cover ends 126a,126b (shown in FIG. 2).

Figure 9A:
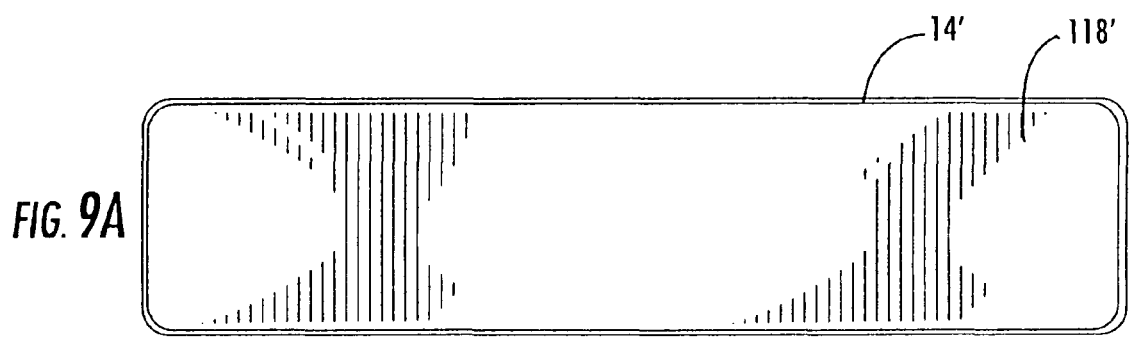
FIGS. 9A-B show a top view of alternate embodiments of the top of the cover.
Figure 9B:
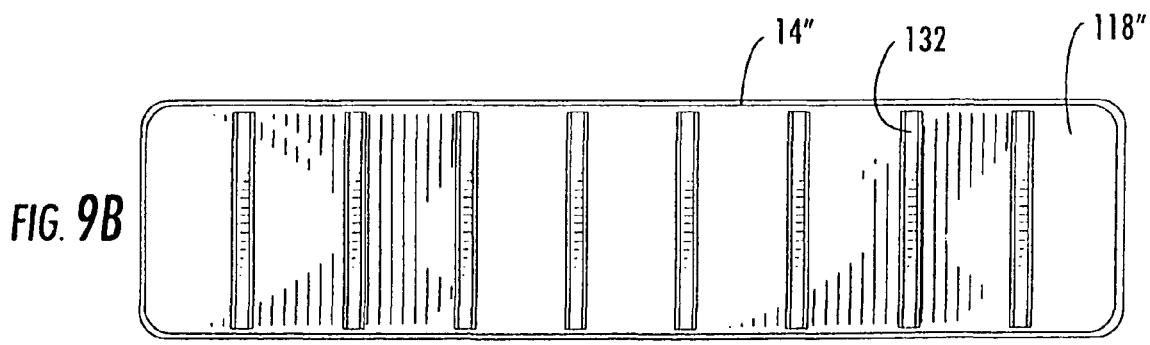

Top 118,118',118" may be flat (FIG. 9A) or have a plurality of structural ribs 132 integrated therein in any suitable pattern (FIGS. 2 and 9B) to confer structural rigidity for dispersing weight across the cover 14,14',14" when attached to body 12. For example, FIG. 9B shows the structural ribs 132 arranged laterally across the top 118", and FIG. 2 shows the structural ribs 132 in a cross-hatched pattern.

Suitable materials for the construction of upper frame 16, enclosure 18, platform 32, and cover 14 include polymers, fiberglass, metal, wood, paperboard fibers, and mixtures thereof. Suitable plastics include polypropylene (PPE), high-density polyethylene (HDPE), polyvinyl chloride (PVC), and acrylonitrile butadiene styrene (ABS), as examples. However, any other suitable rigid, corrosion-resistant material that can withstand the force of poured concrete may be used, such as other rigid plastics or corrosion-resistant metals, as examples. Upper frame and enclosure may be fabricated with different compositions so as to have different mechanical or structural properties with respect to each other.

Upper frame 16, enclosure 18, platform 32, and cover 14 are preferably formed by a molding operation. In one embodiment, enclosure 18 and platform 32 are a single unitary piece, fabricated by molding, such as by injection molding, as an example.

Figure 13:
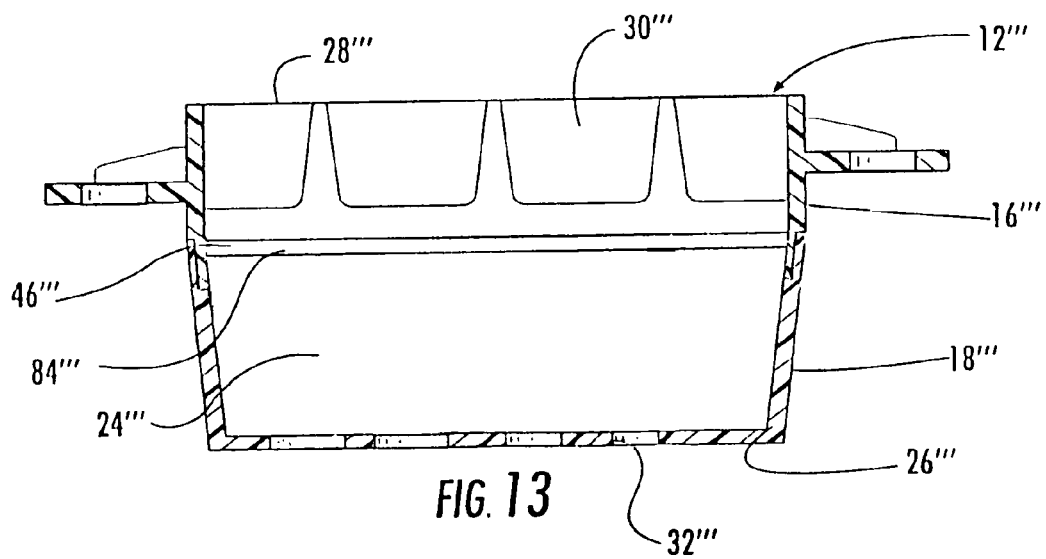
FIG. 13 is a cross-sectional view of yet another embodiment of a pipe protector.

FIG. 13 shows another embodiment, in which the platform 32" is securely attached at the bottom edge 26'". Body 12'" is constructed of upper frame 16'" interlocked to enclosure 18'", as described above. As discussed, attachment of the platform 26'" may be by an adhesive, molding, or any other suitable means. Preferably, enclosure 18'" and platform 32'" are a single unitary piece formed, e.g., by molding such as injection molding.

Figure 12:
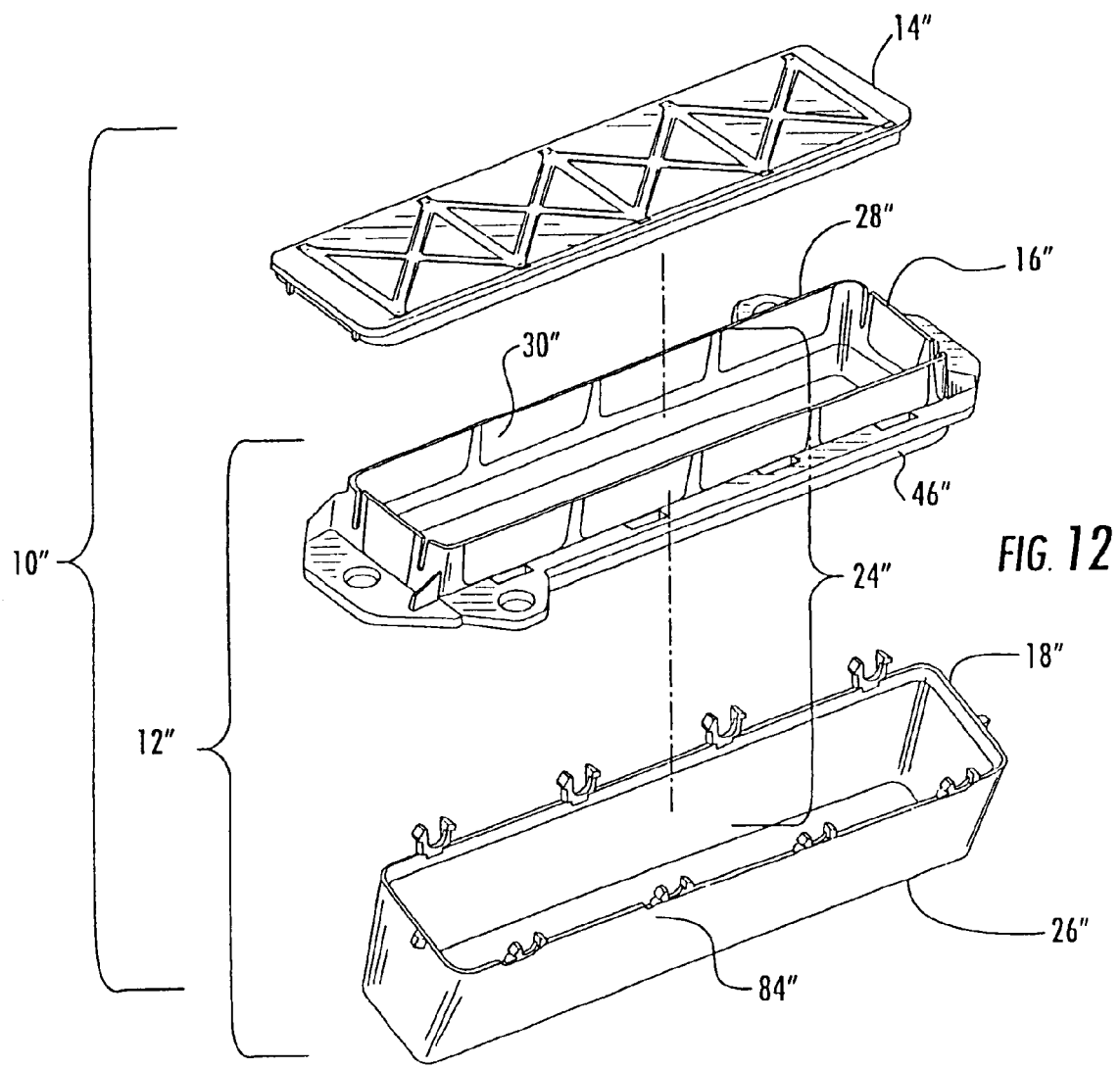
FIG. 12 is a perspective view of another embodiment of a pipe protector.

FIG. 12 shows an exploded view of another embodiment, a pipe protector 10" without a platform, which has an upper frame 16", an enclosure 18", and is shown with a cover 14". As described, upper frame 16" and enclosure 18" are interlocked together by any suitable interlocking means to form the body 12".

Because the height of the body 12 exceeds the depth of the concrete, pipe protector 10 is suitable for use for concrete slabs of any depth. As shown in FIG. 11, the surface of the concrete is represented by a horizontal line M at a vertical distance X from the bottom edge 26, where the X corresponds with the depth of the concrete. As shown, after the concrete is poured, a Portion K of the body extends above the surface of the concrete and a Portion D remains embedded in the concrete. Portion K may be of any height desired.

Relative to the bottom edge 26, the fastening tabs 48 may extend into a plane that will be below or substantially aligned with, or above the intended surface of the concrete. Preferably, the fastening tabs 48 extend into a plane that is in substantial alignment with the surface of the concrete to be poured, as shown. When the concrete is poured to a depth below the fastening tabs 48, the fastening tabs may be snapped or cut off as the securing structure is cut substantially level with the concrete surface.

As shown in FIG. 11, the height of the body 12 will exceed the height of the longest pipe end 38 in the recess 24 so that cover 14 can be attached to the top edge 28. If necessary, the pipe ends 38 may be cut to a height that does not exceed the height of the body. Such cutting may be done before or after the body 12 is secured to the base or after the concrete is poured.

Figure 17A:
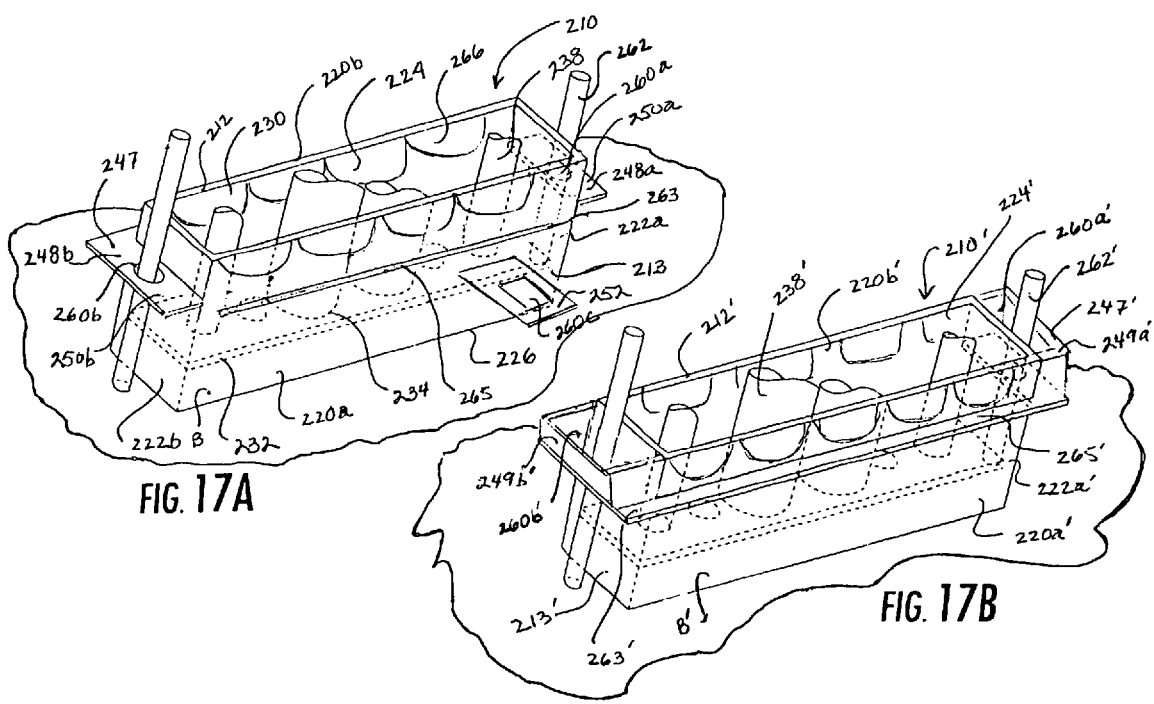
FIGS. 17A-B show a perspective view of yet another embodiment of a pipe protector.
Figure 17B:
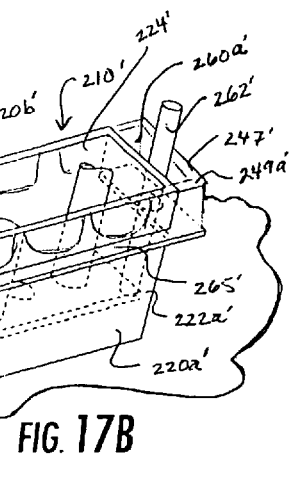

Other embodiments of the inventive pipe protectors are illustrated in FIGS. 17A-B. Pipe protectors 210,210' comprise a body 212,212' and at least one fastening member 247,247' for securing the body to the base. The body 212 has a bottom edge 226, four walls 213 which define a recess 224 therebetween, and a generally rectangular cross-sectional shape. The recess 224 is in communication with an open top end 230. The four walls 213 include two opposed sides 220a, 220b and two opposed longitudinal ends 222a,222b. The fastening member 247,247' may be of any suitable form such as, e.g., a fastening tab 248a,248b (shown in FIG. 17A as a lateral tab 250a,250b extending from body ends 222a,222b and an alternate staking tab 252 extending from body side 220a) or a band (shown in FIG. 17B as band 249a',249b'), both of which define an aperture 260a,260b,260c,260a',260b' for accepting a securing structure 262,262' to secure the pipe protector to the base. The fastening member 247,247', which provides the same function as fastening member 47 described above, extends outwardly from at least one wall 213,213' of the body 212,212', and preferably from at least any two walls.

Both devices 210,210' are shown in FIGS. 17A-B secured to base B,B', with securing structures 262,262' driven through the apertures 260b,260a' prior to the pouring of concrete around the pipe protector.

A platform 232 disposed in body 212 has at least one opening formation 234, and is substantially as described above. The platform 232 may be secured to the body 212 at the bottom edge 226 or to an interior surface of the recess 224, as shown. Alternatively, as described above, the platform 232 may be supported within the recess 224 by any suitable support known in the art such as brackets, a groove, or a shelf, as examples. In the embodiment shown, the platform 232 is located from about ½ inch to about 4 inches from the bottom edge 226 of the body 212 to permit the pipe protector 210 to be placed on an uneven surface such as gravel.

As shown in FIG. 17A, pipe protector 210 has at least one removable segment 266 disposed on at least one wall 213, and preferably on both sides 220a,220b, to provide an expanded access into the recess 224.

In another embodiment, the pipe protector 210,210' comprises a level indicator 263,263' disposed on at least one side wall 220a,220b,220a',220b' for guiding the depth of the poured concrete. As described, the level indicator 263 may be in the form of a groove (shown in FIG. 17A as 265), a mark, an etching, a flange (shown in FIG. 17B as 265') extending outwardly from at least one wall of the body, or other suitable indicia.

Another aspect of the invention is directed to a method of assembling a pipe protector for use at a worksite. The method utilizes an upper frame such as upper frame 16,16",16"',16"", 16""' and an enclosure such as any of the enclosures 18,18", 18"',18"",18""' described above, which have one or more interlocking structures on the upper frame and on the enclosure for securement of the upper frame to the enclosure to form the body. The method includes aligning the bottom connecting portion 46,46",46"',46"",46""' of the upper frame 16,16",16"',16"",16""' with the top connecting portion 84,84",84"',84"",84""' of the enclosure 18,18",18"', 18"",18""' so the interlocking structures on the upper frame are in a spaced cooperative relationship with the corresponding interlocking structures on the enclosure. The bottom connecting portion is then inserted into the enclosure through the top connecting portion until the bottom connecting portion is interfaced against the interior surface of the top connecting portion and the corresponding interlocking structures on the upper frame and the enclosure engage with each other to securely interlock the upper frame to the enclosure so as to form the body 12,12",12"',12"",12""'. In an alternative embodiment, wherein the inner diameter of the bottom connecting portion conforms with the outer diameter of the top connecting portion, the top connecting portion is inserted into the upper frame until the top connecting portion interfaces against the interior surface of the bottom connecting portion and the corresponding interlocking structures on the upper frame and the enclosure engage with each other to form the body.

In yet another aspect of the invention, a method is provided for protecting pipes from misalignment and damage and from injuring individuals at a construction site. The method uses any of the aforedescribed pipe protectors. Prior to the pouring of concrete onto the base B, the bottom edge of a body—such as bottom end 26,26",26"',26"",26""', 226,226' of body 12,12",12"',12"",12""',212,212' of FIGS. 1, 12, 13, 14, 15 and 18A-B—is positioned to substantially contact the base B so the pipe ends 38,238,238' protruding from the base extend into the recess, such as recess 24,24",24"',24"",24""',224, 224'. When the body has a platform—such as platform 32,32', 32",32"',32"",32""',232 in body 12,12"',12"",12""',212—the positioning step further includes inserting each pipe end through the corresponding opening formation in the platform and moving the platform, as a discrete element or as part of the enclosure or assembled body, downwardly toward the base B. When in position, as shown in FIGS. 1 and 3 for body 12 and in FIGS. 17A-B for body 212,212', the body 12,12", 12"',12"",12""',212,212' forms a barrier between an area of the base B' surrounded by the body and an area of the base E external to the body on which the concrete slab C will be formed.

To hold the body in place on the base, a securing structure 62,262,262' described above, is driven through one of the fastening members 47,247,247', such as lateral tab 50a of body 12, alternate staking tab 52a of body 12, lateral tab 250a of body 212, or band 249a' of body 212'. The position of the body is adjusted and a second band or fastening tab is then secured, as described—such as lateral 50b of body 12, lateral tab 250b of body 212, alternate staking tab 252 of body 212, or band 249b' of body 212'. The securing structure 62,262, 262' is driven through the aperture of the second fastening member, such as aperture 60b,260b of lateral tab 50b,250b or through aperture 160b of band 249b, and into the base B to a depth sufficient to restrict the body from moving laterally when the concrete is poured.

The method may be used to create a train of pipe protectors. After the first fastening tab or band is secured, the method includes placing a second pipe protector, preferably having the same type of fastening members—such as any of the bodies 12',12",12"',12"",12""',112,212,212' described above—adjacent to the previously positioned body in an end-to-side configuration or in an end-to-end configuration, as needed. The end-to-end configuration is illustrated in FIG. 5 with bodies 12,12'. As described above, the fastening members 47,147,247 on such body include a first fastening member which extends into a parallel but different plane with respect to a second fastening member. The first fastening member includes a fastening tab or a band extending from the end of the body, such as (i) lateral tab 50a,50a',250a on body end 22a,22a',222a, and (ii) band 149a on upper frame end 144a. The second fastening member may include a fastening tab or a band extending from the end or the side of the body, such as (i) lateral tab 50b,50b',250b from body end 22b,22b', 222b, (ii) alternate staking tab 52a,52b, 252 from body sides 22a,22b,220a, and (v) band 149b,149c extending from the frame end or frame side, respectively, of the upper frame 116. According to the method, the second pipe protector is positioned so its second fastening member (such as lateral tab 50b' or alternate staking tab 52a) is vertically aligned with the first fastening member of the first pipe protector (such as lateral tab 50a), such that the longitudinal end (such as end 22a,22b, 122a,222a of the body) of one pipe protector faces either the longitudinal end or the side of the other pipe protector, as needed. The two adjacent bodies are then interconnected by any suitable means, such as by driving a securing structure through the apertures, such as apertures 60a,60b',160a,260a of the vertically aligned fastening members and into the base to a depth sufficient to secure the adjacent bodies to the base. In an alternative embodiment, the two vertically aligned fastening members may be tied together. The setting and interconnecting steps are repeated as needed to form a sufficiently long line of pipe protector bodies.

Preferably, a removably attachable cover, such as cover 14,14',14", is attached to the top edge—such as 28,28",28"', 28"",28""'—to prevent concrete from entering the recess through the open top end, such as open top end 30,30",30"', 30"",30""'.

In another embodiment, to allow the cover to be attached to the top edge, the pipe ends, such as pipe ends 38 shown in FIGS. 11, 13, and 15, are cut to a height that does not exceed the height of the body. The cutting step may be done before or after the body is secured to the base, or after the concrete is poured.

The concrete C is poured on the base E outside the body to a desired depth. After the concrete has set, the portion of the securing structure 62 that remains exposed above the concrete C is cut substantially flush with the concrete surface and removed so a frame stud, such as frame stud 40, can be placed on the concrete surface and abutted against the frame end, such as 44*a*,44*b* as shown in FIG. 11. The frame stud 40 is secured to the body by driving a fastener 76 such as a nail or screw through at least one stud hole, such as stud hole 74, in the frame end from inside the recess 24.

In one embodiment, at least one removable wall segment, such as wall segments 66,266, are broken away to allow an expanded access into the recess such as recess 24,224.

The present invention may be embodied in other forms without departing from its spirit or essential characteristics. Although specific embodiments are shown by way of example, these embodiments are to be considered in all respects as only illustrative and not restrictive as to the scope of the invention. Rather, the invention covers all modifications, equivalents and alternatives that fall within the scope of the invention, as defined by the following appended claims.

We claim:

1. A pipe protector comprising:
   an upper frame having a bottom connecting portion,
   an enclosure securable to the upper frame, the enclosure having a top connecting portion for interfacing against the bottom connecting portion of the upper frame to form a body suitable for positioning on a base to surround an area with at least one pipe end projecting therefrom for protecting the pipe end from damage by concrete and workers, the body defining a recess and having a bottom edge, the enclosure further having a composition different from that of the upper frame so that the upper frame and the enclosure have different structural properties with respect to each other,
   body-fastening means disposed on at least one selected from the upper frame and the enclosure for securing the pipe protector to the base, and
   a cover that removably snap-locks onto the upper frame.

2. The pipe protector of claim 1, wherein the cover has a top and the top comprises a plurality of structural ribs for conferring rigidity for dispersing weight across the cover.

3. A pipe protector comprising:
   an upper frame having a bottom connecting portion,
   an enclosure securable to the upper frame, the enclosure having a top connecting portion for interfacing against the bottom connecting portion of the upper frame to form a body suitable for positioning on a base to surround an area with at least one pipe end projecting therefrom for protecting the pipe end from damage by concrete and workers, the body defining a recess and having a bottom edge;
   body-fastening means disposed on at least one selected from the upper frame and the enclosure for securing the pipe protector to the base, wherein the body-fastening means comprises at least one fastening member; and
   a platform disposed in the assembled body for providing support to the pipe ends on the base, the platform having at least one opening formation configured to correspond with the pipe ends such that the pipe ends extend through the corresponding opening formation and into the recess when the body is positioned on the base, wherein the platform is secured to the enclosure within the recess.

4. The pipe protector of claim 3, comprising at least one first interlocking structure on the upper frame and at least one complementary second interlocking structure correspondingly positioned on the enclosure to permit attachment of the upper frame to the enclosure to form the body.

5. The pipe protector of claim 3, wherein the platform is located from about ½ inch to about 4 inches from the bottom edge of the body to facilitate the positioning of the pipe protector on an uneven surface.

6. The pipe protector of claim 3, wherein the opening formations have a weakened line for forming an aperture for the at least one pipe end to be extended therethrough.

7. The pipe protector of claim 3, wherein the body has two opposed longitudinal ends and the fastening member has a stud support on the upper surface for positioning a frame stud against one longitudinal end of the body.

8. The pipe protector of claim 3, wherein the enclosure and the platform are a single unitary piece.

9. The pipe protector of claim 3, wherein the upper frame comprises a plurality of removable segments to provide an expanded access into the recess.

10. The pipe protector of claim 3, wherein the body has a plurality of removable wall segments to provide an expanded access into the recess when the pipe protector is placed on the base.

11. The pipe protector of claim 3, wherein the platform is located at the bottom edge.

12. The pipe protector of claim 3, wherein the at least one fastening member comprises a first fastening member and a second fastening member, the first fastening member extending into a parallel but different plane with respect to the second fastening member to permit the pipe protector to be interconnected to another adjacent pipe protector.

13. The pipe protector of claim 3 further comprising an alignment post for guiding the positioning of the enclosure relative to the upper frame during assembly of the body.

14. The pipe protector of claim 3 further comprising a reinforcement band disposed along the top connecting portion of the enclosure for maintaining compression integrity as the body is assembled.

15. The pipe protector of claim 3, wherein the body comprises a level indicator parallel with the bottom edge for providing a sight line for concrete depth to be poured around the pipe protector.

16. The pipe protector of claim 15, wherein the level indicator comprises one selected from the group consisting of a groove, a mark, an etching on the body, and a flange extending outwardly from the body.

17. The pipe protector of claim 15, wherein the level indicator comprises a flange projecting outwardly from at least one side of the body.

* * * * *